United States Patent Office 2,865,873
Patented Dec. 23, 1958

2,865,873

LACQUER EMULSION FOR LITHOGRAPHIC PLATES

George R. Hodgins, Seaford, and Robert F. Leonard, East Rockaway, N. Y., assignors to Litho Chemical and Supply Co. Inc., New York, N. Y., a corporation of New York No Drawing. Application February 6, 1957
Serial No. 638,472

5 Claims. (Cl. 260—17.4)

The present invention relates to a vinyl resin lacquer emulsion for lithographic plates and more particularly to an oleophilic emulsion developer for pre-sensitized lithographic plates, the coating on which contains the condensation product of p-diazo diphenylamine and formaldehyde as the light-sensitive resinous constituent.

An ideal lacquer emulsion should be characterized by the ability to develop and de-sensitize the non-image areas of the various types of pre-sensitized lithographic plates, to deposit a film of relatively abrasion and chemical resistant lacquer upon the image areas of such pre-sensitized lithographic plates and to color the image areas of the plates for eliminating the necessity of "inking up" in order to examine the image. In addition, the lacquer must be oleophilic in nature and should not attack the image areas upon prolonged contact. So far as we are aware, there is no available lacquer emulsion which combines these properties. The stated requirements are not fulfilled by known epichlorhydrin-bisphenol (epoxy) resin with a toluidine toner pigment emulsified with an aqueous solution of gum arabic.

Objects of the present invention are to provide a new lacquer emulsion based on a vinyl chloride-vinyl acetate copolymer having excellent adhesion in combination with high resistance to the oxidizing acids used in press fountains, to produce a lacquer emulsion equaling or closely approaching ideal requirements and generally to effect important improvements in the preparation of lacquer emulsions for lithographic plates. Other objects and advantages will be understood and appreciated by those skilled in this art or will be apparent or pointed out hereinafter such as the excellent ink-receptive properties of the film formed by our new vinyl resin lacquer emulsion and its optimal developing and de-sensitizing properties.

A comparison of vinyl and epoxy resins indicates that vinyl resins have superior resistance to oxidizing acids and are more impermeable to water ("Organic Finishing," vol. 17, No. 11, November 1956, pp. 19 and 20).

A lacquer emulsion according to this invention is composed of the following constituents in substantially the following proportions by weight:

| | Percent |
|---|---|
| VAGH resin | 3.53 |
| Di-isobutyl ketone | 6.95 |
| Xylene | 10.24 |
| Tween 60 | 0.80 |
| Span 60 | 0.09 |
| Span 80 | 1.13 |
| Uncas Maroon | 3.50 |
| Gum arabic (100%) | 15.51 |
| Phosphoric acid (85%) | 4.09 |
| Phenol (100%) | 0.11 |
| Water | 54.05 |

The foregoing lacquer emulsion is prepared by mixing 141.9 grams of VAGH resin formulation
5.46 grams of Tween 60
0.60 gram of Span 60
23.70 grams of Uncas Maroon pigment
99.00 milliliters of 14° Bé. gum arabic solution
406.00 milliliters of aqueous 14° Bé. gum arabic-phosphoric acid solution
7.75 grams of Span 80 in the order named in a Waring Blendor or similar high speed mixer until emulsification occurs, usually in about 45 minutes. The emulsion is then ready for use.

The VAGH resin formulation is made up of 125 grams of VAGH resin in 303.5 milliliters of di-isobutyl ketone and 421.3 milliliters of xylene. VAGH resin[1] is a partially hydrolyzed co-polymer of vinyl chloride and vinyl acetate produced by the Bakelite Co. and having the following composition:

| | Percent |
|---|---|
| Vinyl chloride | 91 |
| Vinyl acetate | 3 |
| Hydroxyl | [2]2.3 |

[1] According to Bakelite Technical Release #6—Vinylite Resins.
[2] 2.6 times greater when calculated as vinyl alcohol.

Tween 60 of Atlas Powder Co. is polyoxyethylene sorbitan mono-stearate.
Span 60 of Atlas Powder Co. is sorbitan mono-stearate.
Span 80 of Atlas Powder Co. is sorbitan mono-oleate.
The 14° Bé. gum arabic solution is made by dissolving 28 grams of gum arabic in 71.8 milliliters of water containing 0.2 gram of phenol (100%).

The aqueous 14° Bé. gum arabic-phosphoric acid solution is made by mixing 2480 milliliters of 14° Bé. gum arabic solution, 160 milliliters of phosphoric acid ($H_3PO_4$) (85% tech.) and 960 milliliters of water. It has a pH of 1.50 and shelf samples show no precipitate over a storage period of 6 months so that the calcium and magnesium phosphates which form from the divalent Ca and Mg ions in the gum arabic and the phosphoric acid are soluble under these acid pH conditions.

Uncas Maroon pigment of Imperial Paper and Color Co. is designated as X-1455 and is sufficiently fine in particle size to avoid the necessity of grinding it and the VAGH resin before blending with the aqueous phase constituents.

A pre-sensitized lithographic plate, such as that known in the trade as Enco, 3M, or Harris Alum-O-Lith, is exposed through a negative to a carbon arc for a known prescribed length of time. In one test series, for example, an Azoplate negative working pre-sensitized plate was exposed for 2 minutes at a distance of 36" to a double carbon 35-ampere arc or for 3 minutes to a single carbon motor-driven Nu Arc 13-ampere lamp at the same distance. A quantity of the vinyl lacquer emulsion sufficient to cover the plate when spread with cotton was applied to the exposed image. The unexposed areas were developed and the exposed areas covered with a film of VAGH and pigment. Developing ink may be applied to the plate or the plate may be inked up on the press.

The quantity of 14° Bé. gum arabic solution may be increased or decreased by 50% by substituting therefor the aqueous 14° Bé. gum arabic-phosphoric acid solution. The Span 80 content may be increased or decreased up to 20% of the percentage above specified without materially changing the coloring properties of the emulsion. The VAGH resin formulation can be increased up to 5% of the amount specified above, but no more, without attacking the diazo image. It can, however, be decreased up to 50% of its value in the VAGH resin formulation if sufficient time of contact of the lacquer emulsion with the image is allowed in order to compensate for loss in coloring efficiency. The Uncas Maroon pigment toner can be replaced by Toluidine Pigment Toner #29 (Uhlich) and by Pigment Scarlet #25AD and #829 (Zinsser), all of which produced satisfactorily colored images. All lacquer emulsions within the foregoing variations have been found to be satisfactory and effective for pre-sensitized plates employing the condensation product of p-diazo diphenylamine and formaldehyde as the light sensitive element.

We have, however, further found that the VAGH resin may be replaced by an equal amount of VMCH resin, which is composed of

| | |
|---|---|
| Vinyl chloride | 86% |
| Vinyl acetate | 13% |
| Maleic acid | 1%, inter-polymerized | so that the formulation then becomes, by weight:

| | Percent |
|---|---|
| VMCH resin | 3.53 |
| Di-isobutyl ketone | 6.95 |
| Xylene | 10.24 |
| Tween 60 | 0.80 |
| Span 60 | 0.09 |
| Span 80 | 1.13 |
| Uncas Maroon | 3.50 |
| Gum Arabic (100%) | 15.51 |
| Phosphoric Acid (85%) | 4.09 |
| Phenol (100%) | 0.11 |
| Water | 54.05 |

The above formulation was satisfactory in all respects.

Lacquer emulsions responding to the present invention are characterized by having developer as well as image intensifier properties and by meeting or very closely approaching the properties of an ideal lacquer emulsion as set forth above, and they, therefore, constitute a significant improvement over currently available lacquer emulsion formulations.

The pigments referred to above have the following chemical compositions:

Uncas Maroon (or Aelio Bordeaux Maroon) is the calcium salt of:

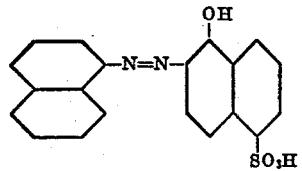

Toluidine Toner #29 (Uhlich) is a red pigment prepared by diazotizing m-nitro-p-toluidine and coupling it to an alkaline solution of β-naphthol.

Pigment Scarlet #25 AD and #829 (Zinsser) are precipitations of the well-known azo dyestuff Pigment Scarlet (Color Index No. 216) with metallic mordants. In the case of #25 AD, the metals are zinc, barium and aluminum and in #829 the metals are lead, barium and aluminum. The exact structural formulas are not known.

Reference is also made to pages 633 (Toluidine Toner) and 652 (Pigment Scarlet 3B) of Lubs, ACS Monograph #127, "The Chemistry of Synthetic Dyes and Pigments."

The invention is defined by the appended claims.

We claim:
1. A lacquer emulsion for pre-sensitized lithographic plates comprising the following constituents in substantially the following proportions by weight:

| | Percent |
|---|---|
| The partially hydrolyzed co-polymer of vinyl chloride and vinyl acetate | 3.53 |
| Di-isobutyl ketone | 6.95 |
| Xylene | 10.24 |
| Polyoxyethylene sorbitan mono-stearate | 0.80 |
| Sorbitan mono-stearate | 0.09 |
| Sorbitan mono-oleate | 1.13 |
| Image coloring toner pigment | 3.50 |
| Gum arabic (100%) | 15.51 |
| Phosphoric acid (85%) | 4.09 |
| Phenol (100%) | 0.11 |
| Water | 54.05 |

2. A lacquer emulsion for pre-sensitized lithographic plates as claimed in claim 1, in which the toner pigment is the calcium salt of

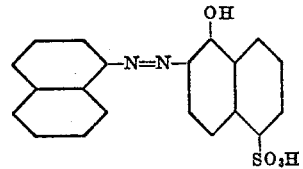

3. A lacquer emulsion for pre-sensitized lithographic plates as claimed in claim 1, in which the partially hydrolyzed co-polymer of vinyl chloride and vinyl acetate is composed of 91% vinyl chloride and 3% vinyl acetate units, with the balance chiefly hydroxyl.

4. A lacquer emulsion for pre-sensitized lithographic plates using the condensation product of p-diazo diphenylamine and formaldehyde as the light-sensitive material, said emulsion consisting of the combination of the following weight constituents in the following percentage proportions:

A vinyl chloride-vinyl acetate resinous copolymer of the following analysis—

| | Percent |
|---|---|
| Vinyl chloride | 91 |
| Vinyl acetate | 3 |
| Hydroxyl | 2.3 |
| Di-isobutyl ketone | 6.95 |
| Xylene | 10.24 |
| Polyoxyethylene sorbitan mono-stearate | 0.80 |
| Sorbitan mono-stearate | 0.09 |
| Sorbitan mono-oleate | 1.13 |
| Calcium salt of | |

[structural formula with $SO_3H$] ......... 3.50

| | |
|---|---|
| Gum arabic (100%) | 15.51 |
| Phosphoric acid (85%) | 4.09 |
| Phenol (100%) | 0.11 |
| Water (by difference) | 54.05 |

5. A lacquer emulsion for pre-sensitized lithographic plates using the condensation product of p-diazo diphenylamine and formaldehyde as the light-sensitive material, said emulsion consisting of the combination of the following constituents in the following weight percentage proportions:

A vinyl chloride-vinyl acetate resinous copolymer of the following analysis—

|  | Percent |
|---|---|
| Vinyl chloride | 86 |
| Vinyl acetate | 13 |
| Maleic acid | 1 |

| | |
|---|---|
| Di-isobutyl ketone | 6.95 |
| Xylene | 10.24 |
| Polyoxyethylene sorbitan mono-stearate | 0.80 |
| Sorbitan mono-stearate | 0.09 |
| Sorbitan mono-oleate | 1.13 |

Calcium salt of

[Chemical structure: two decahydronaphthalene-like ring systems connected by an azo group -N=N-, with OH and SO₃H substituents] .......... 3.50

| | |
|---|---|
| Gum arabic (100%) | 15.51 |
| Phosphoric acid (85%) | 4.09 |
| Phenol (100%) | 0.11 |
| Water (by difference) | 54.05 |

References Cited in the file of this patent
UNITED STATES PATENTS

| | | |
|---|---|---|
| 2,684,953 | Stilbert et al. | July 27, 1954 |
| 2,754,279 | Hall | July 10, 1956 |